(12) United States Patent
Kothuri et al.

(10) Patent No.: US 8,228,326 B2
(45) Date of Patent: Jul. 24, 2012

(54) THREE DIMENSIONAL SURFACE AND SOLID QUERY PROCESSING

(75) Inventors: Ravi Kothuri, Nashua, NH (US); Baris M. Kazar, Nashua, NH (US); Siva Ravada, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 946 days.

(21) Appl. No.: 12/152,147

(22) Filed: May 13, 2008

(65) Prior Publication Data

US 2009/0094010 A1    Apr. 9, 2009

Related U.S. Application Data

(63) Continuation-in-part of application No. 11/906,785, filed on Oct. 3, 2007.

(51) Int. Cl.
    *G06T 15/00*      (2006.01)
(52) U.S. Cl. ............................................ 345/419
(58) Field of Classification Search ................ None
See application file for complete search history.

(56) References Cited

U.S. PATENT DOCUMENTS

| | | | | |
|---|---|---|---|---|
| 5,771,045 A * | 6/1998 | Ghavam et al. | ...... | 345/423 |
| 6,381,605 B1 | 4/2002 | Kothuri et al. | | |
| 6,505,205 B1 | 1/2003 | Kothuri et al. | | |
| 6,917,877 B2 * | 7/2005 | Yang | ...... | 345/630 |
| 7,265,760 B2 * | 9/2007 | Drory et al. | ...... | 345/581 |
| 7,426,455 B1 * | 9/2008 | Antony | ...... | 703/2 |
| 8,115,765 B2 * | 2/2012 | Sommers | ...... | 345/423 |
| 2004/0215641 A1 * | 10/2004 | Kothuri et al. | ...... | 707/100 |
| 2005/0203932 A1 * | 9/2005 | Kothuri et al. | ...... | 707/100 |

OTHER PUBLICATIONS

Kothuri et al., "Pro Oracle Spatial," Nov. 2004, Apress, pp. 21-32.*
Jimenz et al., "3D Collision Detection: A Survey," Apr. 2001, Elsevier Science, Ltd., vol. 25, Issue 2, pp. 274-275.*
Larsson et al. "Efficient Collision Detection for Models Deformed by Morphing," May 2003, Springer-Verlag, pp. 165-167.*
Jimenez et al. "Efficient Collision Detection Between 2D Polygons," Feb. 2003, Union Agency—Scine Press, p. 8.*
Kothuri et al., Overview of the 3-D Spatial Server in Oracle, (Industrial, Applications and Experience Track), VLDB '07, Sep. 23-28, 2007, pp. 1-4, Copyright 2007 VLDB Endowment, ACM 978-1-59593-649—Mar. 7, 2009.

* cited by examiner

*Primary Examiner* — Ulka Chauhan
*Assistant Examiner* — Andrew G Yang
(74) *Attorney, Agent, or Firm* — Kraguljac Law Group LLC

(57) ABSTRACT

Systems, methods, and other embodiments associated with determining whether geometries represented by geometry objects intersect are described. One example method recursively decomposes a higher order geometry (e.g., solid) into a set of lower order geometries (e.g., surfaces) and examines the lower order geometries, continuing the recursion until an intersection decision is reached. The example method includes accessing geometry objects and accessing a spatial index that stores MBVs associated with the geometry objects. The method includes extracting candidate pairs of intersecting features upon determining MBVs associated with the geometry objects intersect and providing the candidate features to a feature-feature logic. The method includes providing an intersection signal based on a features intersection signal provided by the feature-feature logic.

21 Claims, 12 Drawing Sheets

THREE DIMENSIONAL SURFACE AND SOLID QUERY PROCESSING

CROSS REFERENCE TO RELATED APPLICATIONS

This application is a continuation-in-part of a U.S. patent application "Three Dimensional Spatial Engine In A Relational Database Management System", Ser. No. "11/906,785" filed Oct. 3, 2007, having the same inventors: Ravada, Kothuri, & Kazar, and having an, which is assigned to the present assignee.

COPYRIGHT NOTICE

A portion of the disclosure of this patent document contains material subject to copyright protection. The copyright owner has no objection to the facsimile reproduction of the patent document or the patent disclosure as it appears in the Patent and Trademark Office patent file or records, but otherwise reserves all copyright rights whatsoever.

BACKGROUND

Databases no longer just store integers and strings. Databases continue to expand in interesting directions. One direction involves storing three dimensional data types. Conventional database systems may have provided limited support, if any, for query processing on three dimensional surfaces. For example, conventional systems may have provided little, if any, support for identifying whether two surfaces intersect with other. Similarly, conventional systems may have provided little, if any, support for identifying whether two solids intersect each other.

In computational geometry, detecting whether two geometries intersect and computing where the intersection occurs are fundamental tasks. Geometric intersection queries are associated with applications including map overlay in geographic information systems, component layout in very large scale integration (VLSI) design, motion and path planning in robotics, collision detection, and so on.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
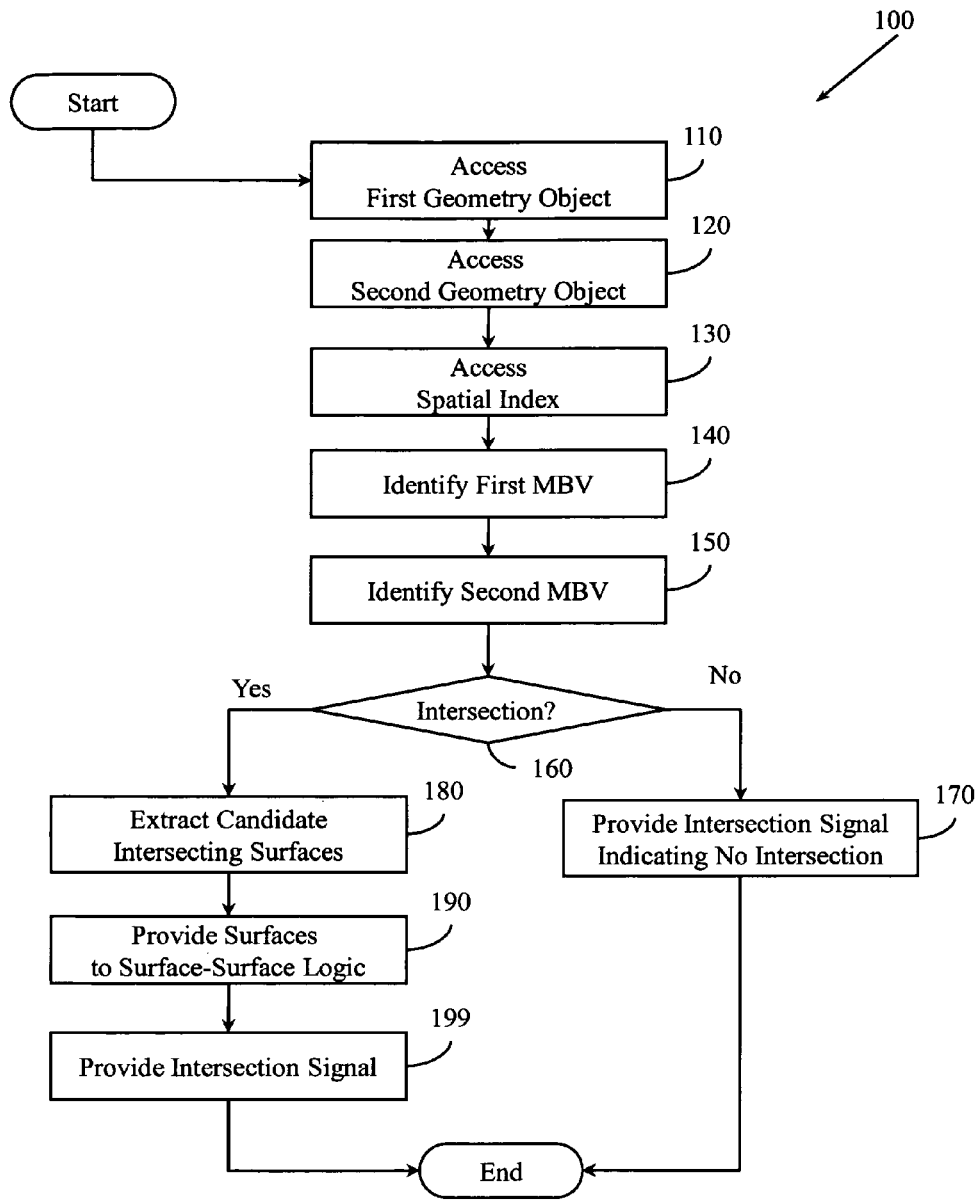
FIG. 1 illustrates an example method associated with three dimensional solid query processing.

Example systems and methods provide support for query processing directed at determining whether three dimensional surfaces and/or solids intersect. Information concerning the three dimensional surfaces and/or solids may be stored in a relational database using a unique data type. For example, data describing a three dimensional surface and/or solid may be stored in an SDO_GEOMETRY data type.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
SQL: structured query language.
OQL: object query language.
USB: universal serial bus.
XML: extensible markup-language.
WAN: wide area network.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discreet logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics' into one physical logic. Similarly, where a single logical logic is described, it may be possible to distribute that single-logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Query", as used herein, refers to a semantic construction that facilitates gathering and processing information. A query may be formulated in a database query language (e.g., SQL), an OQL, a natural language, and so on.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

FIG. 1 illustrates a method 100 associated with three dimensional surface and solid query processing. Method 100 may include, at 110, accessing a first geometry object that stores data associated with a first solid. Accessing the first geometry object may include, for example, acquiring the address of an object, receiving the address of an object, receiving an object, receiving a pointer to an object, and so on. The first solid may be, for example, a polyhedron. The polyhedron may be, for example, a concave polyhedron, a convex polyhedron, and so on. The polyhedron may have an arbitrary number of surfaces. In one example, both the first-geometry object and the second geometry object may be SDO_GEOMETRY objects (see class hierarchy associated with FIG. 11). While method 100 describes processing solids associated with the geometry objects, more generally method 100 may be applied to other geometries that can be represented in a geometry object. In this more general case, method 100 may more generally extract features rather than surfaces and may more generally control, in a more complex geometry to less complex geometry decomposing fashion, a set of feature-feature logics rather than a surface-surface logic specifically. In either example, method 100 will determine whether there is an intersection using a two stage approach that includes a filtering step and an exact match step. The filtering step may include examining minimum bounding volumes (MBVs) associated with an R-Tree based spatial index while the exact matching step may involve point to point comparison. As method 100 decomposes more complex geometries into progressively simpler geometries, the filtering and exact match steps may be repeated. Thus, a later filtering step may include examining minimum bounding boxes (MBBs) rather than MBVs.

Method 100 may also include, at 120, accessing a second geometry object that stores data associated with a second solid and, at 130, accessing a spatial index that stores data concerning MBVs associated with the first geometry object and the second geometry object. In one example, the spatial index may be an R-Tree based spatial index. Accessing the spatial index may include, for example, loading the spatial index into memory accessible to method 100, acquiring a pointer to the spatial index, establishing communication with an RDBMS in which the spatial index is stored, and so on.

Method 100 may also include, at 140, identifying in the spatial index a first minimum bounding volume (MBV) associated with the first solid. Identifying the first MBV may include traversing the spatial index to arrive at a leaf node associated with the MBV. Method 100 may also include, at 150, identifying in the spatial index a second MBV associated with the second solid. Once again the identification may include a traversal of the spatial index. With the two MBVs available, method 100 may determine, at 160, whether the MBVs intersect. If the MBVs do not intersect, then the solids likely do not intersect (see special case hole-in-solid processing associated with method 400 (FIG. 4)) and thus, an intersection signal that indicates that the first solid and the second solid do not intersect may be provided at 170.

If the determination at 160 is that the first MBV and the second MBV do intersect, then method 100 may continue, at 180, with extracting a set of candidate pairs of intersecting surfaces associated with the first geometry object and the second geometry object. While intersecting surfaces are described, method 100 may more generally extract candidate pairs of intersecting features.

Having extracted the candidate pairs of intersecting surfaces, method 100 may, at 190, provide the set of candidate pairs of intersecting surfaces to a surface-surface logic. The surface-surface logic may be controlled to determine whether the surfaces intersect. The surface-surface logic may further decompose the surfaces and rely on lower-level feature-feature logics (e.g., line-line) to determine whether the surfaces intersect. Once again, method 100 may, more generally, provide a set of candidate pairs of intersecting features to a feature-feature logic that will determine whether the features intersect.

Method 100 may also include, at 199, providing a solid-solid intersection signal that indicates whether the first solid and the second solid intersect. The signal is based, at least in part, on a surface-surface intersection signal provided by the surface-surface logic. Once again, the intersection signal may, more generally, describe whether two geometries intersect. The signal provided by method 100 may be data that is responsive to a query that sought to determine whether two query objects intersected.

While FIG. 1 illustrates various actions occurring in serial, it is to be appreciated that various actions illustrated in FIG. 1 could occur substantially in parallel. By way of illustration, a first process could access geometry objects, a second process could access a spatial index and search it for relevant MBVs, a third process could extract features and a fourth process could provide a feature interaction signal. While four processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform method 100. While executable instructions associated with method 100 are described as being stored on a computer-readable medium, it is to be appreciated that executable instructions associated with other example methods described herein may also be stored on a computer-readable medium.

Figure 2:
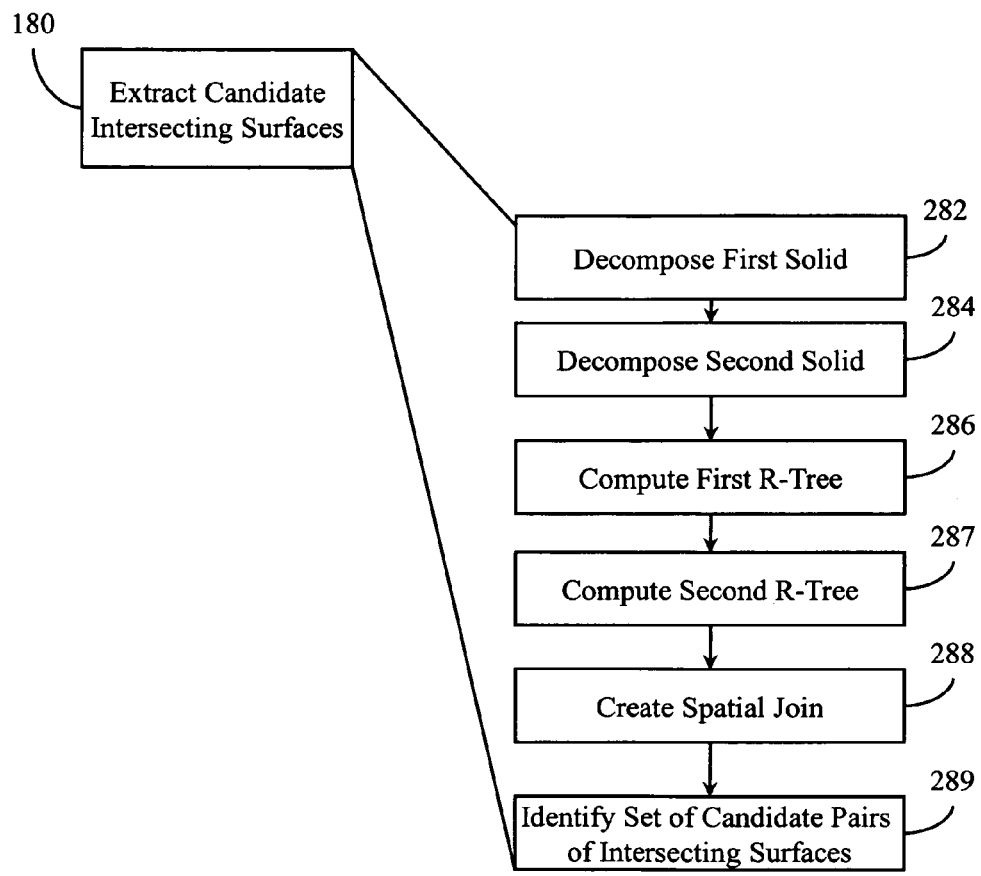
FIG. 2 illustrates another example method associated with three dimensional surface and solid query processing.

FIG. 2 illustrates a portion of method 100 (action 180) in greater detail. Extracting the set of candidate pairs of intersecting surfaces at 180 may include a set of actions. For example, the extracting (action 180) may include, at 282, decomposing the first solid into a first set of surfaces. Note that when the geometry is a concave geometry, it may be decomposed as a concave geometry without performing a concave to convex transformation and then performing a convex decomposition. Action 180 may also include, at 284, decomposing the second solid into a second set of surfaces. Recall that more generally method 100 (FIG. 1) may process geometries and features, therefore the decomposing at 282 and 284 may more generally relate to decomposing a geometry.

Action 180 may also include, at 286, computing a first R-Tree associated with the first set of surfaces. The first R-Tree is to store data concerning minimum bounding boxes associated with the first set of surfaces. Similarly, action 180 may include, at 287, computing a second R-Tree associated with the second set of surfaces. Like the first R-Tree, the second R-Tree is to store data concerning minimum bounding boxes associated with the second set of surfaces. At this point two R-Trees having information about two sets of bounding boxes is available. Therefore, a spatial join of these two R-Trees may occur at 288 and the set of candidate pairs of intersecting surfaces can be identified at 289. The identification at 289 involves examining the spatial join to determine where, if anywhere, the minimum bounding boxes overlap.

Figure 3:
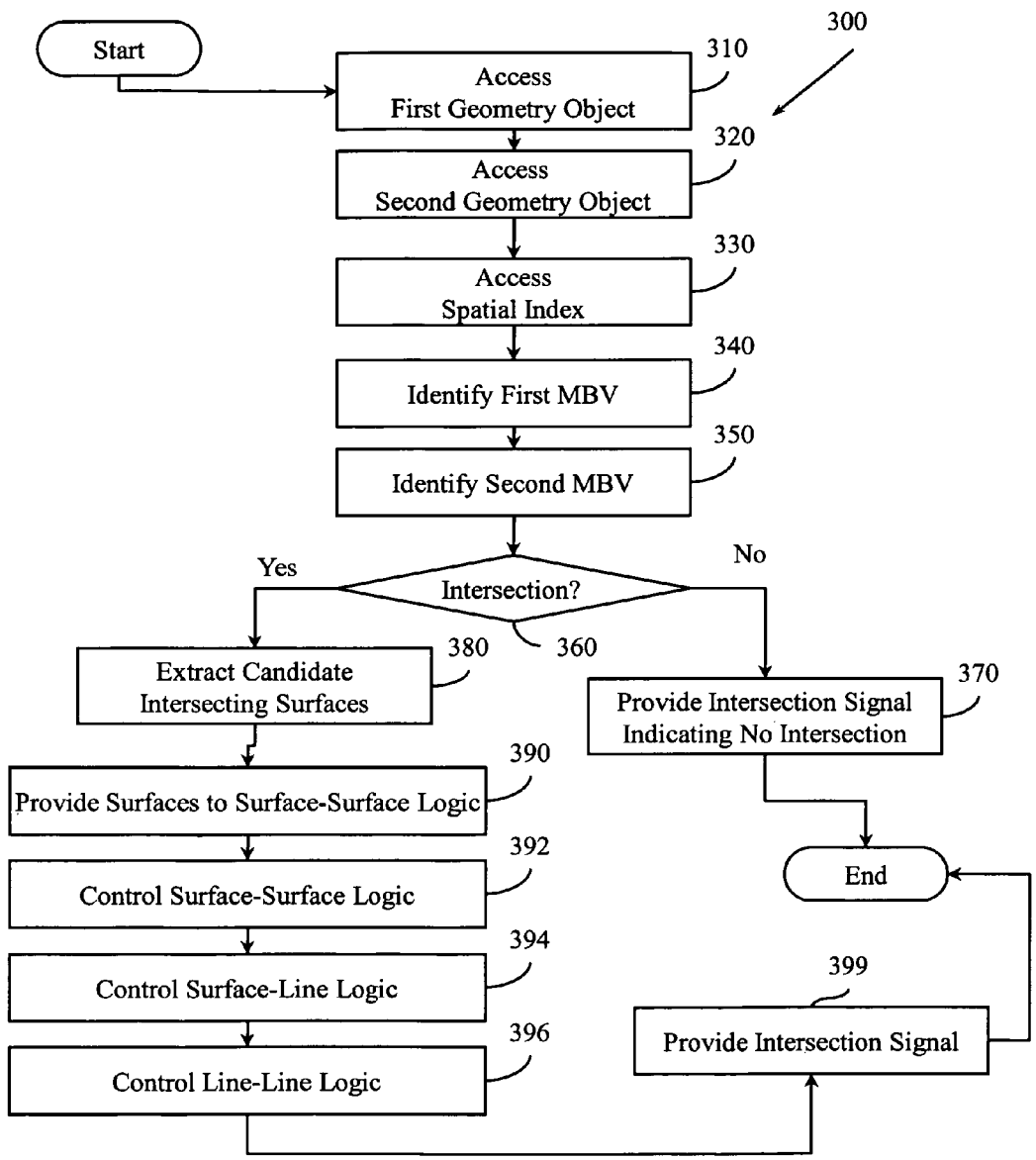
FIG. 3 illustrates another example method associated with three dimensional surface and solid query processing.

FIG. 3 illustrates a method 300 associated with three dimensional surface and solid query processing. Method 300 includes several actions similar to those described in connection with method 100 (FIG. 1). For example, method 300 includes accessing a first geometry at 310, accessing a second geometry at 320, accessing a spatial index at 330, identifying a first MBV at 340, and identifying a second MBV at 350. Similarly, method 300 includes, at 360, determining whether the two MBVs intersect and, at 370, selectively providing a signal that indicates that the geometries do not intersect. Method 300 also includes, at 380, selectively extracting candidate intersecting surfaces and, at 390, providing those surfaces to a surface-surface logic. However, method 300 includes additional actions.

Method 300 includes, at 392, controlling the surface-surface logic to decompose a set of surfaces into a set of lines and to provide at least one member of the set of surfaces and at least one member of the set of lines to a surface-line logic. Controlling the surface-surface logic at 392 may include, for example, sending a message to the logic, sending a signal to the logic, invoking a process associated with the logic, invoking a method associated with the logic, providing a set of data to the logic, and so on. The controlling at 392 includes controlling the surface-surface logic to establish a value for the surface-surface intersection signal. The value for the surface-surface intersection signal is to be based, at least in part, on the value of a surface-line intersection signal provided by a surface-line logic. Thus, method 300 includes controlling a logic to determine whether two less complicated geometries (e.g., surfaces) intersect as part of determining whether two more complicated geometries (e.g., solids) intersect. Method 300 continues with controlling logics associated with determining the intersection of even less complicated geometries (e.g., lines).

Method 300 also includes, at 394, controlling the surface-line logic to decompose at least one surface received from the surface-surface logic into a second set of lines. With the less complicated geometry (e.g., line) available, the controlling at 394 includes controlling the surface-line logic to provide at least one member of the set of lines received from the surface-surface logic and at least one member of the second set of lines to a line-line logic. The controlling at 394 may also include controlling the surface-line logic to establish a value for the surface-line intersection signal. The value may be based, at least in part, on a value of a line-line intersection signal provided by a line-line logic. The controlling at 394 illustrates how a complex operation, determining intersection between complicated geometries (e.g., solids) can be broken down into less complex operations like determining intersection between surfaces, lines, points, and so on.

Therefore, method 300 includes, at 396, controlling the line-line logic to establish a value for the line-line intersection signal based on whether two lines intersect. One skilled in the art will appreciate that the line-line logic may itself decompose the lines into points and control a line-point logic, a point-point logic, and/or other logics to determine whether two points intersect, and, if so, where they intersect. Method 300 concludes at 399 by providing an intersection signal that indicates whether the first geometry and the second geometry intersect. In one example, the signal may also indicate where the two geometries intersect.

Figure 4:
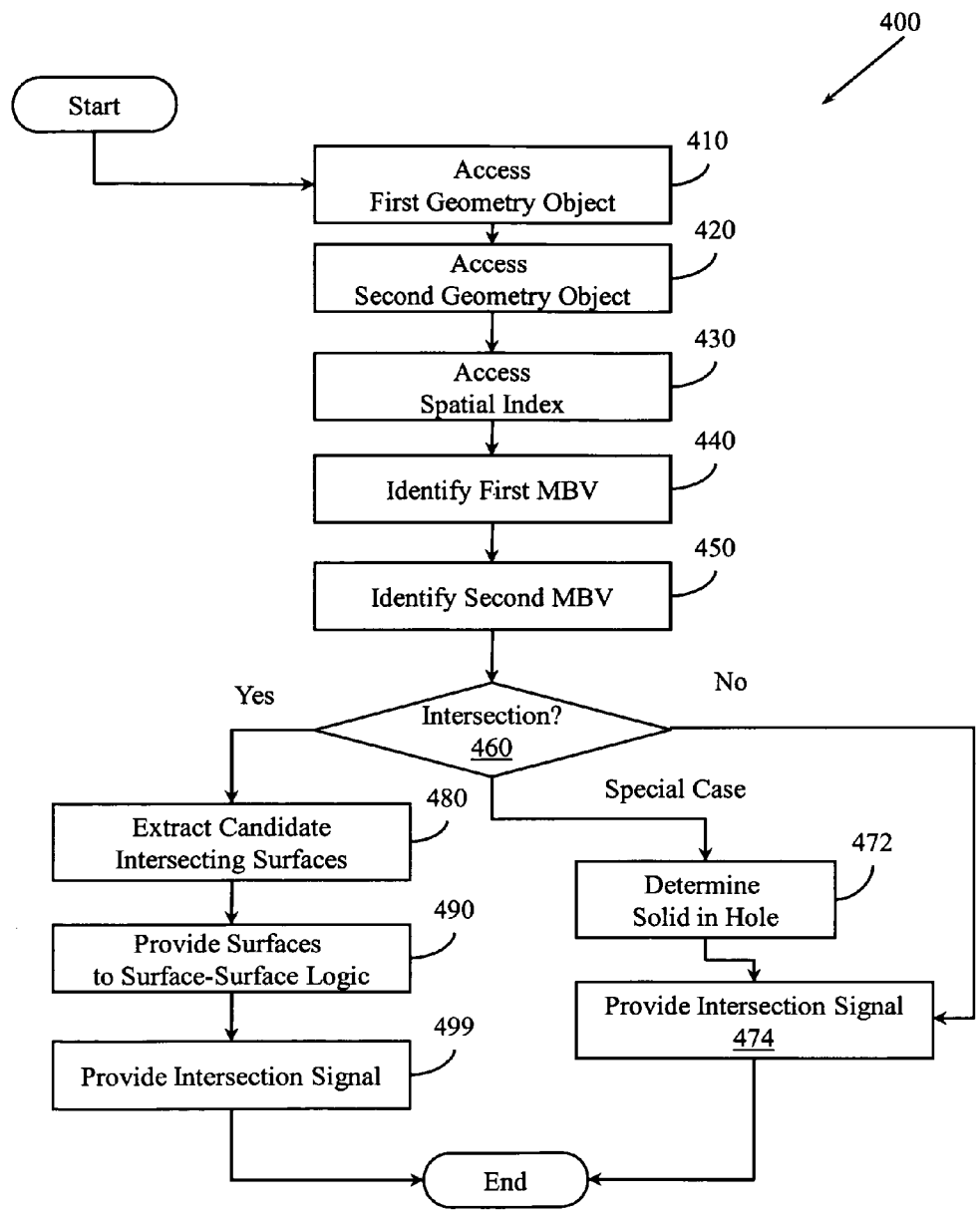
FIG. 4 illustrates another example method associated with three dimensional surface and solid query processing.

FIG. 4 illustrates a method 400 associated with three dimensional surface and solid query processing. Method 400 includes several actions similar to those described in connection with method 100 (FIG. 1). For example, method 400 includes accessing a first geometry at 410, accessing a second geometry at 420, accessing a spatial index at 430, identifying a first MBV at 440, and identifying a second MBV at 450. Similarly, method 400 includes, at 460, determining whether the two MBVs intersect. Method 400 also includes, at 480, selectively extracting candidate intersecting surfaces, providing, at 490, those surfaces to a surface-surface logic, and providing, at 499, an intersection signal. However, method 400 includes additional actions associated with special case processing.

The special case exists when either or both of the geometries includes a hole. The hole may be, for example, a void in the center of a cube, a void running the length of a cylinder, and so on. While this special case is described in terms of one of the geometries including a hole, it is to be appreciated that both geometries processed by method 400 may include holes. To accommodate hole processing, a geometry object may include data describing an outer geometry associated with the outside of the solid and data describing an inner geometry associated with a hole in the solid. The hole is to be bounded by the outer geometry.

Therefore, method 400 includes, at 472, determining whether one of the geometry objects is inside a hole in the other geometry object upon determining that the first MBV and the second MBV intersect. The determining at 472 includes determining whether the second geometry object is bounded by the inner geometry associated with the first geometry object. As described above, both geometries and/or either geometry may include a hole. Thus, in one example, a determination that two geometries intersect is made when it is determined that the first MBV and the second MBV intersect, that the outer geometry of the first geometry object intersects the outer geometry of the second geometry object, that the outer geometry of the first geometry object is not completely inside the inner geometry of the second geometry object, and that the outer geometry of the second geometry object is not completely inside the inner geometry of the first geometry object. Method 400 also includes, at 474, providing an intersection signal based on the solid in hole determination made at 472.

Figure 5:
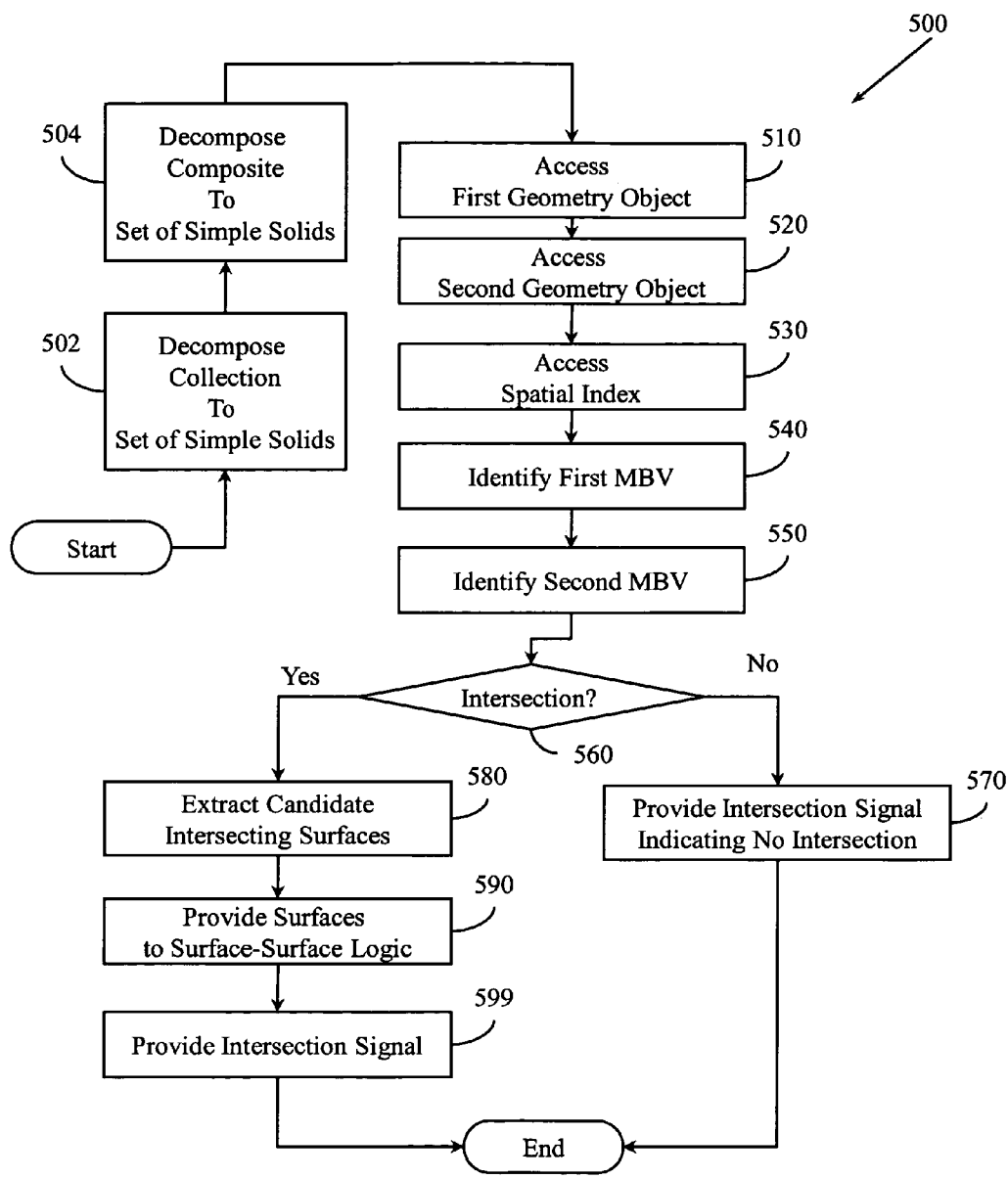
FIG. 5 illustrates another example method associated with three dimensional surface and solid query processing.

FIG. 5 illustrates a method 500 associated with three dimensional surface and solid query processing. Method 500 includes several actions similar to those described in connection with method 100 (FIG. 1). For example, method 500 includes accessing a first geometry at 510, accessing a second geometry at 520, accessing a spatial index at 530, identifying a first MBV at 540, and identifying a second MBV at 550. Similarly, method 500 includes, at 560, determining whether the two MBVs intersect. Method 500 also includes, at 580, selectively extracting candidate intersecting surfaces, providing, at 590, those surfaces to a surface-surface logic, and providing, at 599, an intersection signal or, at 570, a signal indicating no intersection. However, method 500 includes additional actions.

In some cases, a query object and/or an object to which a query object is compared may not be simple solids. For example, one or both of the objects may be a collection of geometries. Thus, method 500 may include, at 502, decomposing the collection of geometries into a set of simple solids. Having decomposed the collection into a set of simple solids, method 500 may then determine intersection between members of the set of simple solids and another solid. While a collection of solids is described, it is to be appreciated that the collection may, more generally, be a collection of entities modeled by an SDO_GEOMETRY object.

Similarly, a query object and/or an object to which a query object is compared may be a composite solid. Therefore method 500 may include, at 504, decomposing the composite solid into a set of simple solids. Having decomposed the composite solid into a set of simple solids, method 500 may then determine intersection between members of the set of simple solids and another solid. While a composite solid is described, it is to be appreciated that the collection may, more generally, be a composite of entities modeled by an SDO_GEOMETRY object.

Figure 6:
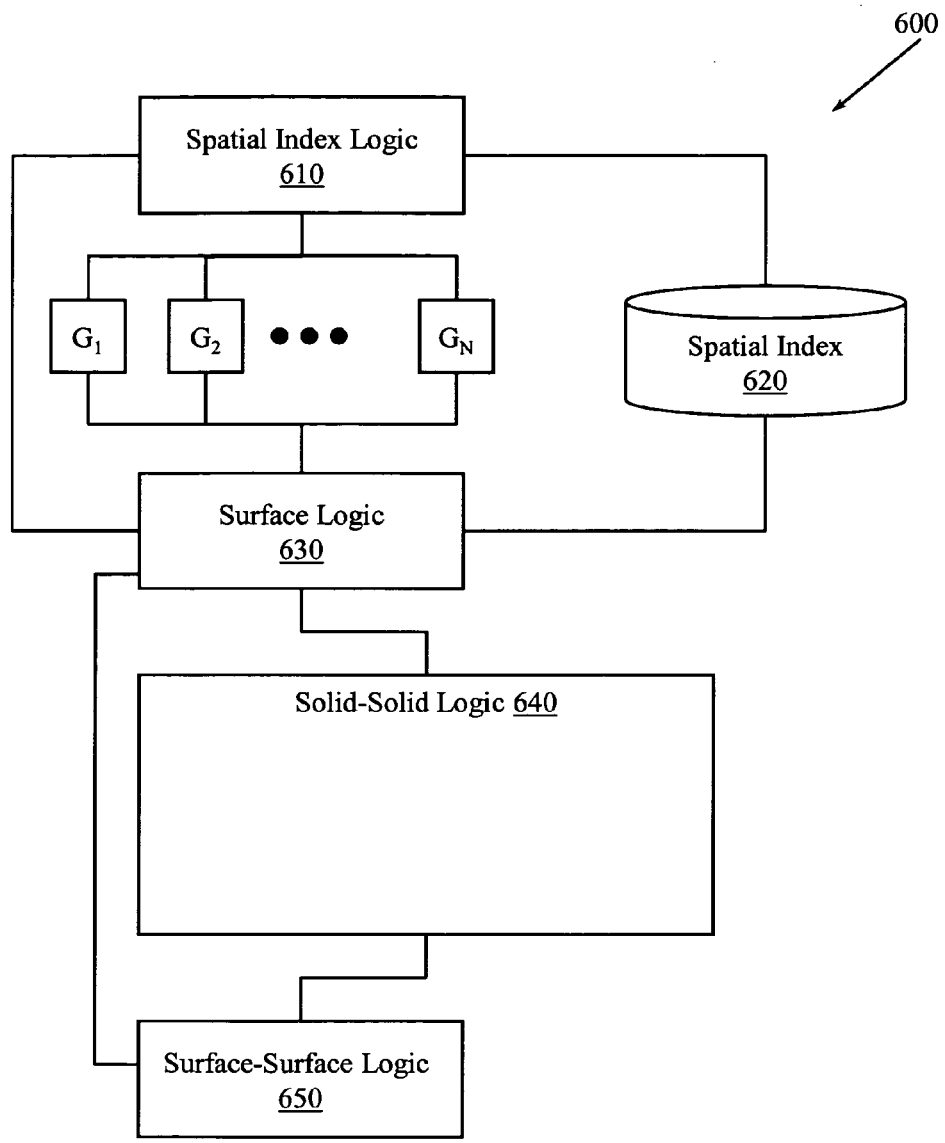
FIG. 6 illustrates an example system associated with three dimensional solid query processing.

FIG. 6 illustrates a system 600 associated with three dimensional surface and solid query processing. System 600 includes a spatial index logic 610. Spatial index logic 610 is to produce a spatial index 620. Index 620 is to store data describing a set of MBVs associated with a set of geometry objects (e.g., $G_1, G_2, \ldots G_N$). In one example, spatial index logic 610 creates an R-Tree based spatial index 620. Leaf nodes in the spatial index 620 may store data describing an MBV.

System 600 also includes a surface logic 630. Surface logic 630 is to identify a set of surfaces associated with a member of the set of geometry objects. Identifying the set of surfaces may include decomposing the geometry into a set of surfaces.

System 600 also includes a solid-solid logic 640. Solid-solid logic 640 is to determine whether two solids intersect. The two solids are associated with two geometry objects for which MBVs are present in the spatial index. In one example, the two geometry objects are SDO_GEOMETRY objects. The intersection is determined using a filter and refine approach. Therefore, solid-solid logic 640 is to examine data stored in the spatial index to identify candidate MBVs and/or to make a triage decision. If the MBVs do not intersect, a triage decision identifying that the solids do not intersect can be made. If there are intersecting MBVs, then solid-solid logic 640 is to make an intersection decision based on whether a member of a first set of surfaces associated with a first geometry intersects with a member of a second set of surfaces associated with a second geometry. The solid-solid logic 640 may not make this determination directly but rather may rely on a logic that deals with less complicated geometries (e.g., surfaces).

Thus, the system 600 may include a surface-surface logic 650 to which the solid-solid logic 640 may provide the first set of surfaces and the second set of surfaces. The surface-surface logic 650 is to determine whether two surfaces intersect. The surface logic 630 is to identify a set of candidate pairs of intersecting surfaces associated with the two solids and to provide the set of candidate pairs of intersection surfaces to the surface-surface logic 650. One skilled in the art will appreciate that the surface-surface logic 650 may in turn rely on a logic or set of logics that determine whether lower order entities (e.g., lines, points) intersect. The surface-surface logic 650 may itself use a filter and refine approach. The filter portion may employ an R-Tree based spatial index that stores information (e.g., minimum bounding boxes) about surfaces. The refine approach may decompose candidate surfaces into lower order entities and determine intersection of the lower order entities.

Figure 7:
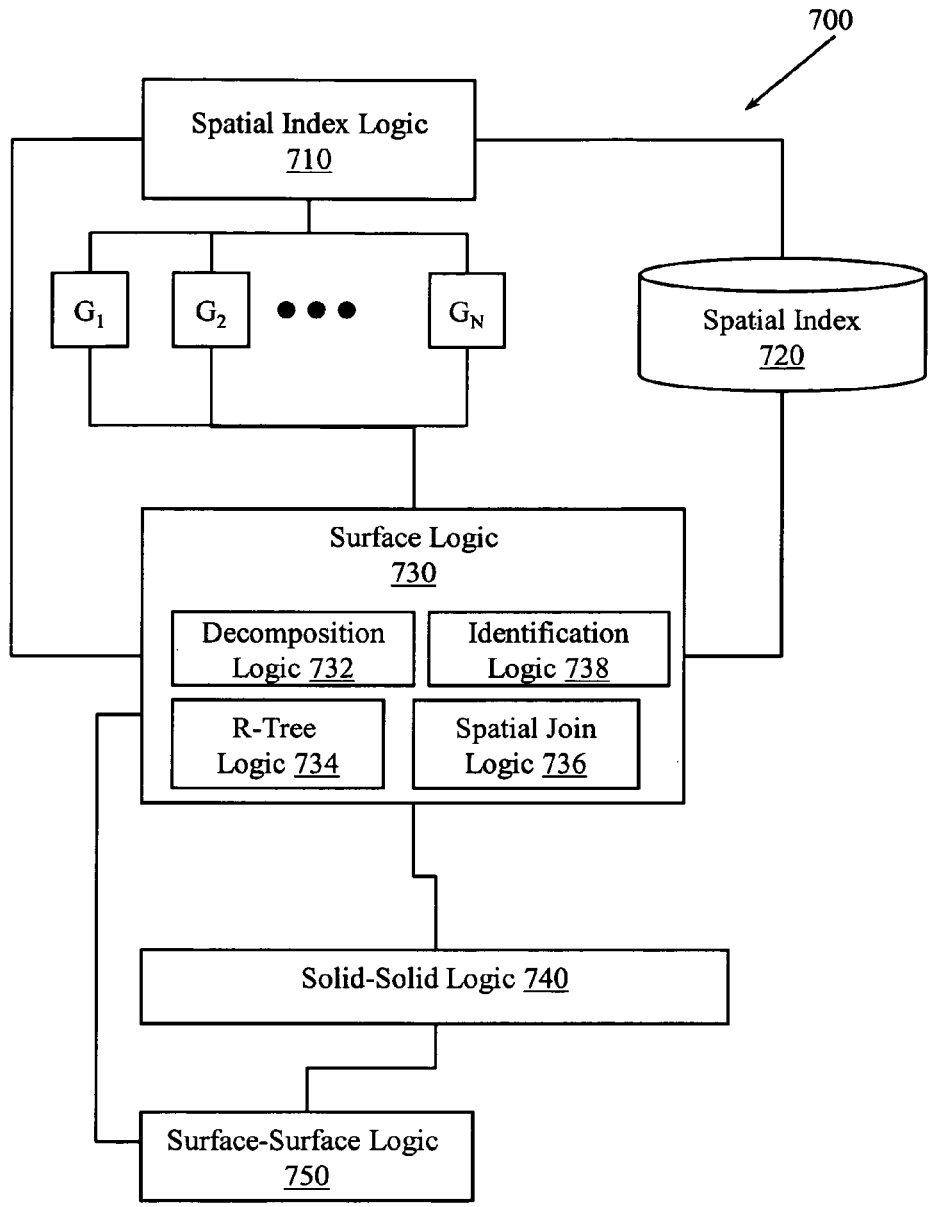
FIG. 7 illustrates another example system associated with three dimensional surface and solid query processing.

FIG. 7 illustrates a system 700 that shares several elements with system 600 (FIG. 6). For example, system 700 includes a spatial index logic 710 that creates a spatial index 720. System 700 also includes a surface logic 730, a solid-solid logic 740, and a surface-surface logic 750. However, system 700 illustrates further refinements of surface logic 730.

In system 700, surface logic 730 includes a decomposition logic 732. Decomposition logic 732 is to decompose a solid into a set of surfaces. As described above, a solid may be a concave polyhedron, a convex polyhedron, a composite solid, a solid that includes a collection of geometries, a solid that includes a hole(s), and so on. While a solid and surfaces are described, more generally, decomposition logic 732 is to break the higher order geometry (e.g., solid) into a set of lower order geometries (e.g., surfaces). Rather than make an intersection decision on the highest order entity (e.g., solid), an intersection decision can be passed down to a lower order geometry (e.g., surface, line, point) intersection decision maker after the decomposition logic 732 determines the set of lower order geometries.

Surface logic 730 also includes an R-Tree logic 734 to compute an R-Tree associated with the set of surfaces. The R-Tree is computed and stored to facilitate a lower order filter and refine intersection determination approach. Thus, when starting with a solid, the R-Tree stores data associated with minimum bounding volumes associated with the set of surfaces. More generally, the R-Tree logic 734 receives a higher order geometry (e.g., solid) and computes and stores an R-Tree storing data associated with a lower order geometry (e.g., surface).

Surface logic 730 also includes a spatial join logic 736. Spatial join logic 736 is to create a spatial join of R-Trees produced by the R-Tree logic 734. In the solid in, surface out example, the spatial join logic 736 is to produce a spatial join of R-Trees associated with sets of surfaces.

Surface logic 730 also includes an identification logic 738. Identification logic 738 is to identify a set of candidate pairs of intersecting surfaces. The identification is based, at least in part, on the spatial join produced by the spatial join logic 736.

Figure 8:
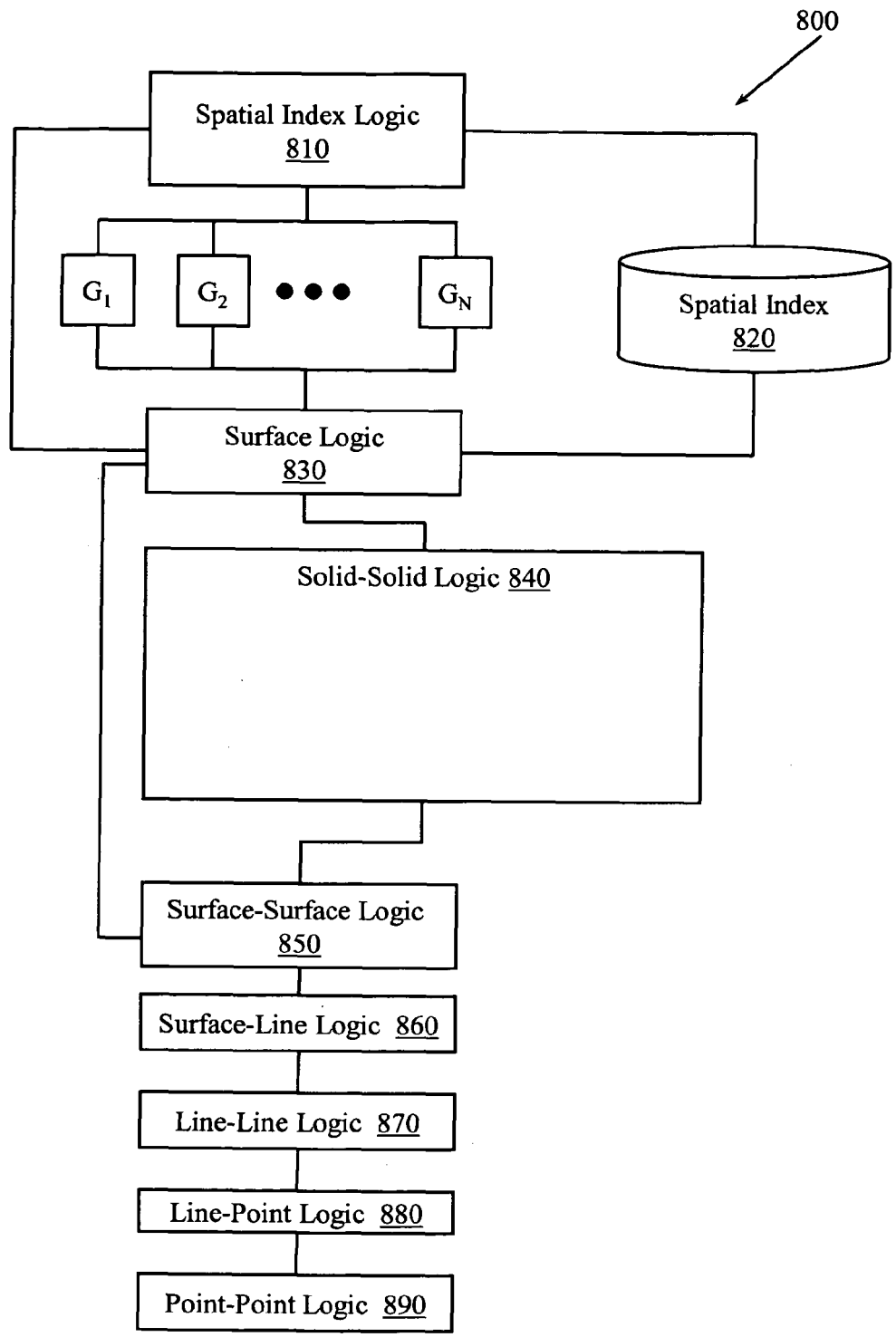
FIG. 8 illustrates another example system associated with three dimensional surface and solid query processing.

FIG. 8 illustrates a system 800 that shares several elements with system 600 (FIG. 6). For example, system 800 includes a spatial index logic 810 that creates a spatial index 820. System 800 also includes a surface logic 830, a solid-solid logic 840, and a surface-surface logic 850. However, system 800 includes additional elements.

System 800 includes a point-point logic 890 to perform a lowest order intersection determination. Point-point logic 890 is to determine whether a first point and a second point intersect. The two points may be provided by a logic tasked with determining a higher order intersection (e.g., line-point logic 880). The higher order intersection may be between, for example, a line and a point.

Thus, system 800 includes a line-point logic 880 to perform a low order intersection determination. Line-point logic 880 is to determine whether a line and a point intersect. The line and the point may be provided by a logic tasked with determining a higher order intersection (e.g., line-line logic 870). The higher order intersection may be between, for example, two lines. Line-point logic 880 may rely on a lower order logic like point-point logic 890 and therefore line-point logic 880 may decompose a line it receives into a set of points then provide a member of the set of points and a received point to the point-point logic 890.

System 800 may also include a line-line logic 870 to perform a slightly higher order intersection determination. Line-line logic 870 is to determine whether a first line and a second line intersect. The two lines may be provided by a logic tasked with determining a higher order intersection (e.g., surface-line logic 860). The higher order intersection may be between, for example, a surface and a line. Line-line logic 870 may rely on a lower order logic like line-point logic 880 and therefore line-line logic 870 may decompose a line it receives into a first set of points and then provide a member of the set of points and a second received line to the line-point logic 880.

System 800 may also include a surface-line logic 860 to perform an even higher order intersection determination. Surface-line logic 860 is to determine whether a surface it receives and a line it receives intersect. The surface and the line may be provided by a logic tasked with determining a higher order intersection (e.g., surface-surface logic 850). The higher order intersection may be between, for example, two surfaces. Surface-line logic 860 may rely on a lower order logic like line-line logic 870 to determine whether a surface and a line intersect and therefore surface-line logic 860 may decompose a received surface into a set of lines and provide a member of the set of lines and a received line to the line-line logic 870.

Figure 9:
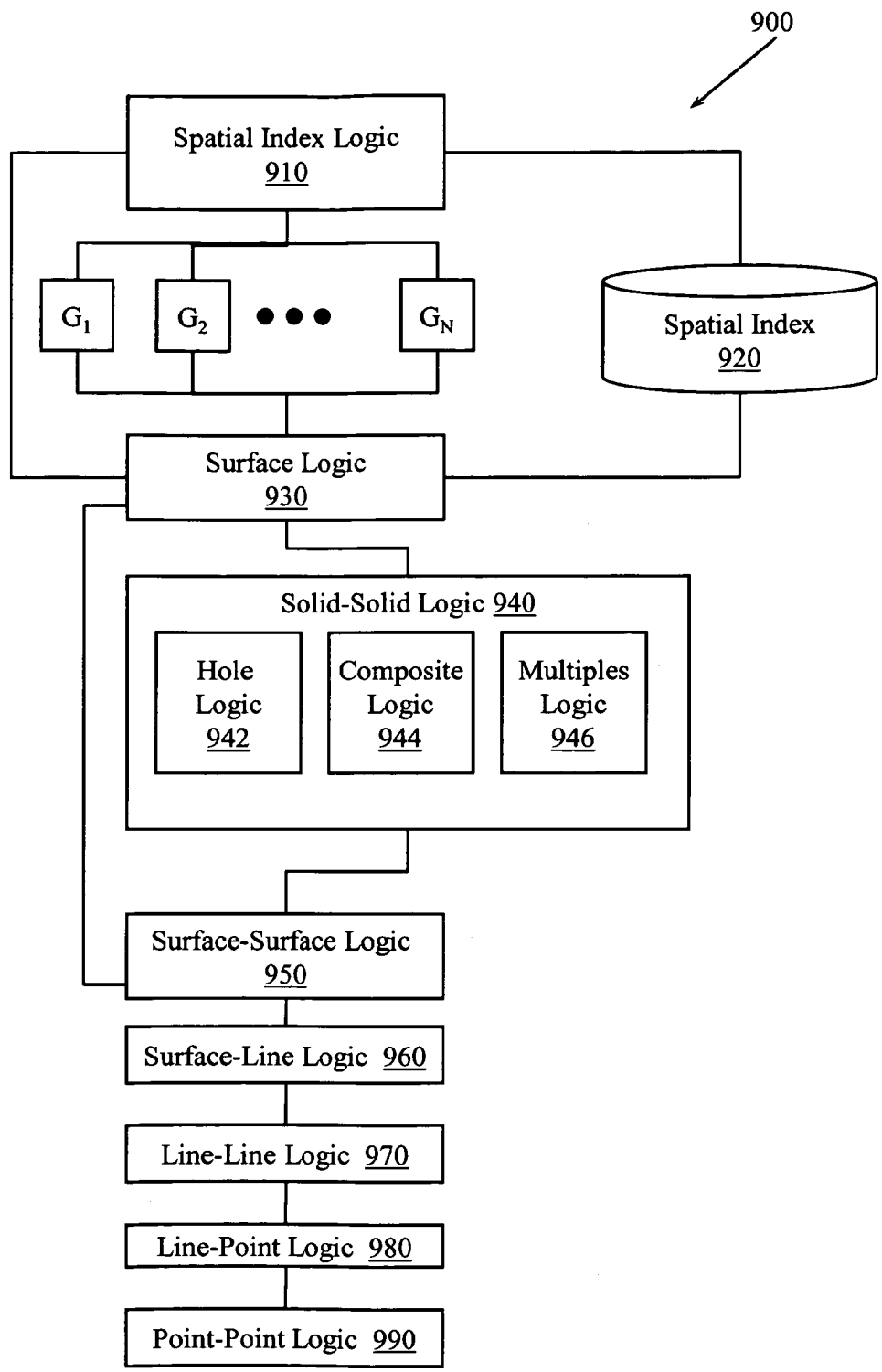
FIG. 9 illustrates another example system associated with three dimensional surface and solid query processing.

FIG. 9 illustrates a system 900 that shares several elements with system 800 (FIG. 8). For example, system 900 includes a spatial index logic 910 that creates a spatial index 920. System 900 also includes a surface logic 930, a solid-solid logic 940, and a surface-surface logic 950. Similarly, system 900 includes a surface-line logic 960, a line-line logic 970, a line-point logic 980, and a point-point logic 990.

However, system 900 illustrates further refinements of solid-solid logic 940. The further refinements of solid-solid logic 940 address special case solids. For example, a solid may have a hole in it. Thus, solid-solid logic 940 includes a hole logic 942. Hole logic 942 is to determine whether a first solid includes an inner geometry describing a hole and whether a second solid resides in the hole. If a second solid resides completely within a hole in a first solid, MBVs associated with the two solids may intersect but the solids themselves may not intersect. Therefore, hole logic 942 may impose additional conditions on determining whether two solids intersect. For example, hole logic 942 may only indicate that two solids intersect when their MBVs intersect, when the outer geometry of the first solid is not completely bounded by the inner geometry of the second solid, and when the outer geometry of the second solid is not completely bounded by the inner geometry of the first solid.

Solid-solid logic 940 also includes a composite solids logic 944. When a query is presented that asks whether two solids intersect, it is possible that one or both of the solids may be a composite solid. Therefore, composite solids logic 944 is to decompose a composite solid into a set of simple solids and then present the set of simple solids to the solid-solid logic 940 for an intersection determination. Presenting the set of simple solids may include, for example, iterating over the set of simple solids and making a determination for each of the simple solids.

Solid-solid logic 940 also includes a multiples solid logic 946. Like a solid associated with a query may be a composite solid, so too may a solid associated with a query be a collection of solids or other geometries. Therefore, a solid may include multiple solids and/or geometries. Multiples solid logic 946 is to address this special case and to decompose a solid comprising a collection of solids into a set of simple solids and then to provide the set of simple solids to the solid-solid logic 940. Once again, providing the set of simple solids may include iterating over a set of simple solids and making an intersection determination for each of the set.

Figure 10:
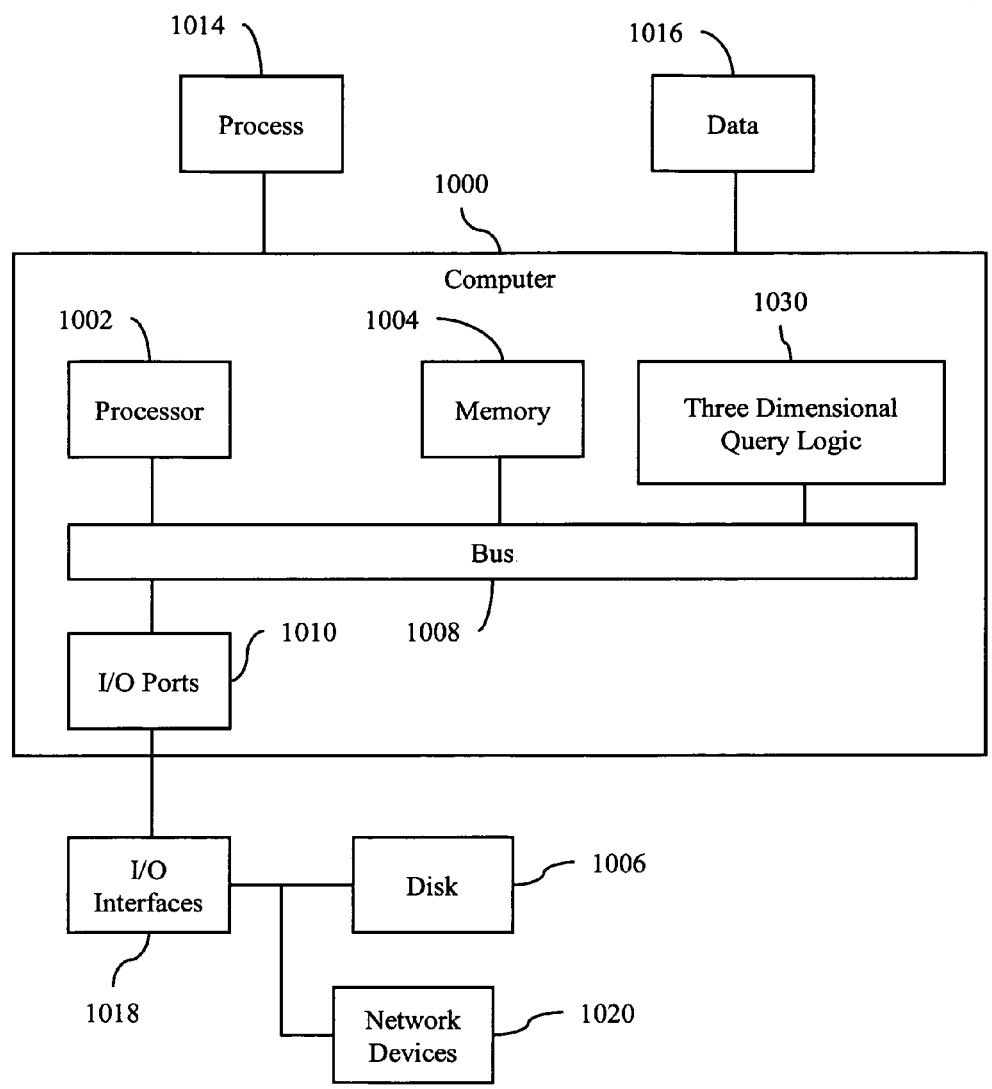
FIG. 10 illustrates an example computing environment in which example systems and methods, and equivalents, may operate.

FIG. 10 illustrates an example computing device in which example systems and methods described herein, and equivalents, may operate. The example computing device may be a computer 1000 that includes a processor 1002, a memory 1004, and input/output ports 1010 operably connected by a bus 1008. In one example, the computer 1000 may include a three dimensional query logic 1030 configured to facilitate three dimensional surface and solid query processing. In different examples, the logic 1030 may be implemented in hardware, software, firmware, and/or combinations thereof. While the logic 1030 is illustrated as a hardware component attached to the bus 1008, it is to be appreciated that in one example, the logic 1030 could be implemented in the processor 1002.

Thus, logic 1030 may provide means (e.g., hardware, software, firmware) for representing a set of MBVs associated with a set of geometries. The MBVs may be represented by data associated with an SDO_GEOMETRY object. The means may be implemented, for example, as an ASIC programmed to compute MBVs for a geometry (e.g., solid). The means may also, be implemented as computer executable instructions that are presented to computer 1000 as data 1016 that are temporarily stored in memory 1004 and then executed by processor 1002. Logic 1030 may also provide means (e.g., hardware, software, firmware) for spatially indexing the set of MBVs. In one example, the MBVs may be spatially indexed using an R-Tree. The leaf nodes of the R-Tree may store data describing MBV vertices and/or edges to connect the vertices. Logic 1030 may also include means (e.g., hardware, software, firmware) for determining whether a first solid and a second solid do not intersect. Determining that two solids do not intersect may be based on the set of MBVs indexed in the spatial index (e.g., R-Tree). For example, if the MBVs associated with the two geometries do not intersect, then the two geometries likely do not intersect. Logic 1030 may also include means (e.g., hardware, software, firmware) for determining whether the first solid and the second solid do intersect. This determining may be based on decomposing geometries (e.g., solids) into sets of features (e.g., surfaces) and then determining whether the lower order geometries (e.g., surfaces) intersect. In one example, the decomposition may continue down to lower order geometries down to and including a point.

Generally describing an example configuration of the computer 1000, the processor 1002 may be a variety of various processors including dual microprocessor and other multi-processor architectures. A memory 1004 may include volatile memory and/or non-volatile memory. Non-volatile memory may include, for example, ROM, PROM, and so on. Volatile memory may include, for example, RAM, SRAM, DRAM, and so on.

A disk 1006 may be operably connected to the computer 1000 via, for example, an input/output interface (e.g., card, device) 1018 and an input/output port 1010. The disk 1006 may be, for example, a magnetic disk drive, a solid state disk drive, a floppy disk drive, a tape drive, a Zip drive, a flash memory card, a memory stick, and so on. Furthermore, the disk 1006 may be a CD-ROM drive, a CD-R drive, a CD-RW drive, a DVD ROM, and so on. The memory 1004 can store a process 1014 and/or a data 1016, for example. The disk 1006 and/or the memory 1004 can store an operating system that controls and allocates resources of the computer 1000.

The bus 1008 may be a single internal bus interconnect architecture and/or other bus or mesh architectures. While a single bus is illustrated, it is to be appreciated that the computer 1000 may communicate with various devices, logics, and peripherals using other busses (e.g., PCIE, 1394, USB, Ethernet). The bus 1008 can be types including, for example, a memory bus, a memory controller, a peripheral bus, an external bus, a crossbar switch, and/or a local bus.

The computer 1000 may interact with input/output devices via the I/O interfaces 1018 and the input/output ports 1010. Input/output devices may be, for example, a keyboard, a microphone, a pointing and selection device, cameras, video cards, displays, the disk 1006, the network devices 1020, and so on. The input/output ports 1010 may include, for example, serial ports, parallel ports, and USB ports.

The computer 1000 can operate in a network environment and thus may be connected to the network devices 1020 via the I/O interfaces 1018, and/or the I/O ports 1010. Through the network devices 1020, the computer 1000 may interact with a network. Through the network, the computer 1000 may be logically connected to remote computers. Networks with which the computer 1000 may interact include, but are not limited to, a LAN, a WAN, and other networks.

Figure 11:
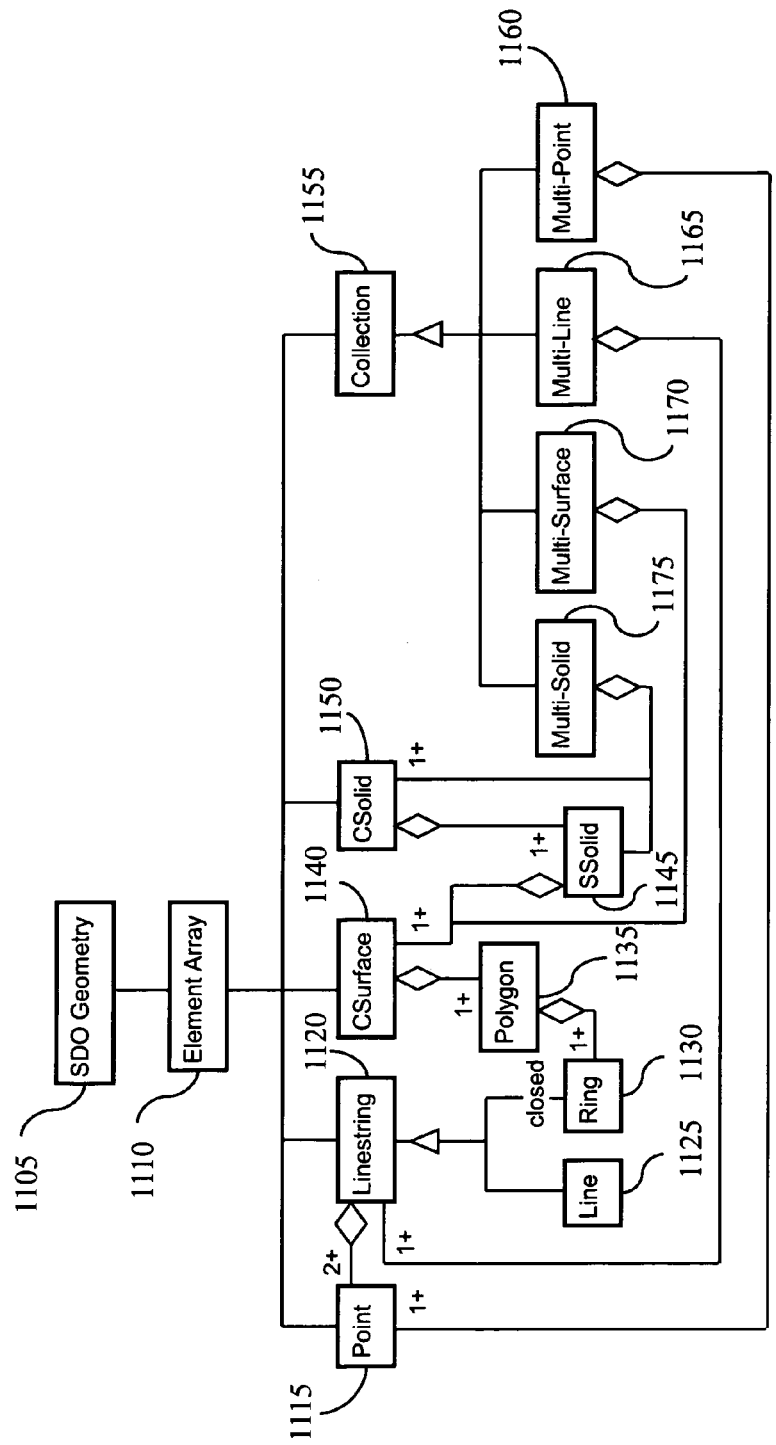
FIG. 11 illustrates an example class structure for a data type that may be used to store data representing a three dimensional geometry object in a spatial system and an RDBMS.

FIG. 11 illustrates an example class structure diagram for the SDO_GEOMETRY 1105 data type. Instances of the SDO_GEOMETRY data type may be used to store data representing a three dimensional geometry object in a spatial reference system. The SDO_GEOMETRY 1105 may include an array 1110 of elements to store data representing the spatial features of a three dimensional geometry object. The element array 1110 may store data to represent spatial elements described above (e.g., a point 1115, a linestring 1110, a surface 1140, a solid 1150, a collection 1155). The collection may be a heterogeneous collection or a homogenous collection (e.g., multi-point 1160, multi-line 1165, multi-surface 1170, multi-solid 1175).

Two or more points 1115 form a linestring 1110. An open linestring 1110 is called a line 1115. A closed linestring 1110 is called a ring 1130. One or more rings 1130 (1 outer and zero or more inner rings) within the same plane form a polygon 1135. One or more polygons 1135 form a surface 1140, called a composite surface if it has more than 1 polygon and the surface is connected via shared parts of edges. Two or more outer rings of a composite surface 1140 can be on the same or different planes. One outer surface and zero or more inner surfaces (represented as 1 or more in FIG. 11) form a simple solid 1145, which is referred to as SSolid 1145 in FIG. 11, if all the involved surfaces bound a closed volume. One or more adjacent (e.g., sharing at least a two dimensional part of a face) simple solids 1145 form a composite solid 1150, which is referred to as CSolid 1150 in FIG. 11. A composite solid 1150 can be represented as a simple solid 1145 by removing shared polygons. The collection types 1155 are formed as elements of an appropriate type. One or more points 1115 form a multi-point 1160, one or more linestrings 1110 form a multi-line 1165, one or more surfaces 1140 form a multi-surface 1170 and one or more solids (e.g., SSolid 1145, CSolid 1150) form a multi-solid 1175.

The SDO_GEOMETRY 1105 may be realized in a database as an object type with attributes including a geometry type, a coordinate system identifier, an array of ordinates, and an array of element descriptors. In one example, the geometry type may be stored in an SDO_GTYPE attribute. This attribute specifies the type of three dimensional geometry. In one example, the type may be a point, a line, a surface, a solid, a heterogeneous collection, or a homogeneous collection (e.g., multi-point, multi-line, multi-surface, multi-solid).

In another example, the coordinate system identifier may be stored in an SDO_SRID attribute. This attribute specifies the coordinate system or spatial reference for the geometry. Different types of coordinate systems may be supported including local, geocentric 3-D, geographic 3-D, and compound systems. Local refers to coordinate systems that are specific to an application. Geocentric 3-D refers to three dimensional Cartesian coordinate systems. Geographic 3-D refers to coordinate systems that perform calculations on the three dimensional ellipsoidal data that represent the terrestrial surface. Compound refers to coordinate systems that combine Geographic 2-D systems (e.g., projected, geodetic) with vertical coordinate systems that measure height from a reference point (e.g., sea level). Whereas the local coordinate systems can be used in any application, the rest are typically used to model data on the surface of the Earth (e.g., buildings in a city model). Since the Earth's surface is not an exact geometric shape, different data and the associated coordinate systems use ellipsoids to maximize the accuracy for specific regions and specific tasks (e.g., area computations, distance computations).

In one example, an array of ordinates may be stored in an SDO_ORDINATES attribute. This attribute represents an array for storing the ordinates (e.g., x, y, z) of the vertices of the three dimensional geometry. In another example, an array of element descriptors may be stored in an SDO_ELEM_INFO attribute. This attribute represents an array of element descriptors describe how to connect the ordinates stored in the SDO_ORDINATES attribute. SDO_ELEM_INFO may contain a set of triplets, where a triplet defines a sub element of a geometry. Triplets consist of a starting offset in the SDB_ORDINATES array for the element, a sub element type (e.g., composite surface, polygon), and an interpretation or shape descriptor of the sub element. The SDO_ELEM_INFO attribute may also be conceptualized as a set of simpler elements that when assembled according to the types of sub elements and the SDO_ORDINATES attribute, form the three dimensional geometry object.

One example system may process a query on a table (set) of 3-d geometries (e.g., surfaces, solids) using an R-tree index in a relational database management system. Example queries include an intersection query. Recall that an instance of an SDO_GEOMETRY may be referred to as a "geometry". Given a geometry as the query object, an intersection query may identify geometries that intersect the query object.

These queries may require the table being queried to have a spatial index. Using the spatial index, the queries may be processed in a two-stage filter and refine approach. Using three dimensional MBVs in the spatial index, candidate geometries that may satisfy a query window are first identified. Candidates may then be further processed to refine and identify the final result. This two-step filtering mechanism allows relatively high resource consuming geometry engine operations to be performed on a few candidate geometries and uses a subsequent fast-filtering process to weed out irrelevant candidates.

Figure 12:
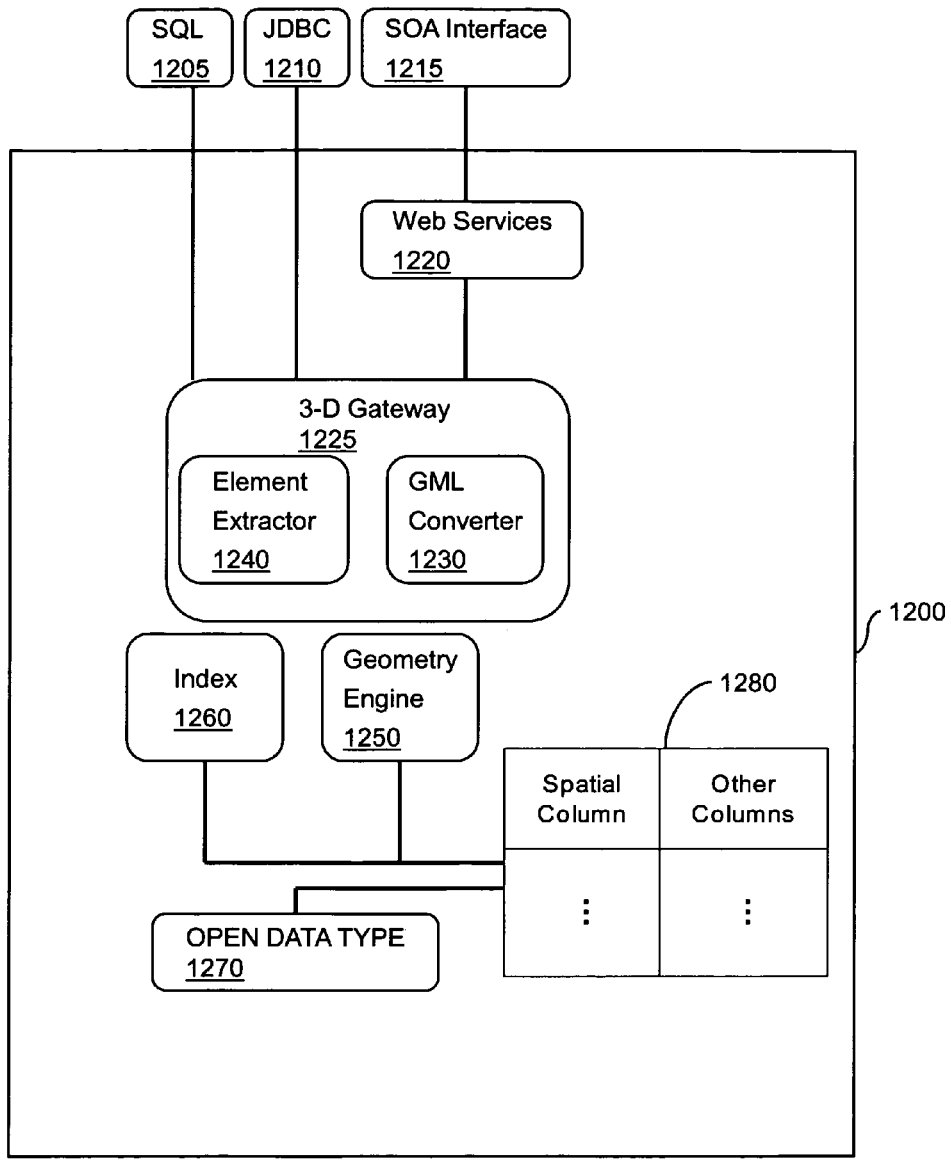
FIG. 12 illustrates an example three dimensional spatial engine associated with a relational database management system (RDBMS).

FIG. 12 illustrates a three dimensional spatial server system 1200. Spatial server system 1200 may be a three dimensional spatial engine associated with a relational database management system (RDBMS). System 1200 may receive data representing a geometric characteristic(s) of a three dimensional object. System 1200 may interact with an instance of an open data type 1270 (e.g., SDO_GEOMETRY) that may be referred to, for example, as a geometry. Instances of this open data type 1270 may be used to store data representing the geometric characteristics of the three dimensional object. Open data type 1270 may facilitate specifying a coordinate system for the three dimensional data. Instances of the data type 1270 may also be used to store data representing the geometric characteristics of the three dimensional object in a database 1280.

The system 1200 may include a geometry engine 1250. The geometry engine 1250 may compute geometric properties of three dimensional objects. Geometric properties computed may include, for example, length, area, volume, and so on. When computing volume, the system 1200 and/or geometry engine 1250 may decompose a first set of geometries into a second set of geometries and then make determinations and calculations using the second set. For example, geometry engine 1250 may decompose complicated geometries (e.g., geometries with holes) into simpler geometries.

The geometry engine 1250 may also compute geometric relationships (e.g., distance, intersection) between objects. For example, an interaction function may determine whether two geometries intersect. The geometry engine 1250 may determine intersection between geometries incorporating inner geometries (e.g., inner cores, inner holes). R-trees may be constructed on different sub-elements of the geometries and used to eliminate the non-interacting parts of the input geometries, thus ensuring scalability with the complexity of the geometries.

The geometry engine 1250 may also compute other types of topological relationships including whether an object is inside another object, whether two objects touch, and so on.

The geometry engine 1250 may incorporate transformation functions including rotation and translation of a three dimensional object. In addition, the geometry engine 1250 may also provide an extrusion function to convert a two dimensional representation of an object to a three dimensional representation. The extrusion result may depend on input of the heights of the vertices of the three dimensional object.

The geometry engine 1250 may validate geometry objects. The geometry objects may include three dimensional objects (e.g., surfaces, solids, collections). Validation may be based, for example, on processing data representing the geometric characteristics of the object and a set of validation rules. The system may provide specific validation rules for the different spatial elements of geometry objects.

Surfaces are the building blocks for defining solids. Solids may be defined by both outer and inner boundaries. Surfaces may include rings, polygons, composite surfaces, and so on. A ring can be defined as a closed string of connected non-intersecting lines that lie on the same plane. A ring R is typically specified as the sequence of n+1 vertices $R=<V_1, V_2, \ldots, V_n, V_1>$ where the first and the $(n+1)^{th}$ vertex are the same (to make the ring closed). Other vertices in the ring are distinct. Pairs $<V_1, V_2+,>$ represent a directed edge connecting the vertex $V_i$ to $V_{i+1}$. No two edges of the ring are to intersect except the first edge $<V_1, V_2>$ and the last edge $<V_n, V_1>$ that can touch at vertex $V_1$. This property may be referred to as no self intersection.

A polygon may be defined as a single contiguous area in a planar space bounded by one outer or exterior ring $PR_e$ as the exterior boundary, and zero or more inner or interior rings $PR_{i1}, \ldots PR_{ik}$ which are interior to the outer ring and non-overlapping with one another. System 1200 and/or geometry engine 1250 may validate a polygon. The validation may involve processing a number of rules. The rules may include, for example, a validity of rings test, a co-planarity of rings test, a proper orientation test, a single contiguous area test, a non-overlapping inner rings test, and an inner-outer disjointness test.

System 1200 and/or geometry engine 1250 may validate a composite surface. A composite surface may be defined as a contiguous area formed as a composition of M non-overlapping polygons. The polygons may or may not be in the same plane. The validation of a composite surface may involve processing a number of rules. The rules may include, for example, a validity of polygons test, a non-overlapping but edge-sharing nature test, and a contiguous area test. The validity of polygons test validates when the M polygons in the composite surface are valid polygons. The non-overlapping but edge-sharing nature test validates when no two polygons $P_i$ and $P_j$ overlap. For example, if two polygons $P_i$ and $P_j$ are in the same plane, the area of intersection of the two polygons is zero. However, two polygons may touch, within a tolerance, in a part of a line or edge. The contiguous area test validates when every polygon in the composite surface is reachable from any other polygon in the composite surface by appropriate tracing of the shared parts of edges.

Solids encompass simple solids and composite solids. A simple solid is defined as a single volume bounded on the exterior by one exterior composite surface and on the interior by zero or more interior composite surfaces. To demarcate the interior of the solid from the exterior, the polygons of the boundary are oriented so that their normal vectors point outward from the solid. In addition, polygons of the composite surfaces have an outer ring but no inner ring. System 1200 and/or geometry engine 1250 may validate a simple solid. The validation may involve processing a number of rules. The rules may include, for example, a single volume check, an inner-outer check, an orientation check, an element check, and a no inner rings in polygons check.

The single volume check may require that the volume of the simple solid be contiguous. The single volume check may include a closedness test and a connectedness test. The closedness test validates when the boundary is closed. The boundary is closed when the vector sum of the edges in the boundary traversal is zero, meaning that edges on the boundary are traversed an even number of times. The connectedness test validates when the volume is connected. This means that components of the solid are reachable from other components.

The inner-outer check may include an inside test and a no-intersect test. The inside test validates when surfaces marked as inner boundaries are inside the solid defined by the exterior boundary. The no-intersect test validates when inner boundaries do not intersect. Inner boundaries, however, may touch under the condition that the solid remains connected. The orientation check validates when the polygons in the surfaces are oriented so that the normals of the polygons point outward from the solid that they bound. In one example, the normal of a planar surface is defined by the right-hand thumb rule. The volume bounded by an exterior boundary is computed as a positive value if faces are oriented so that normals are pointing away from the solid. Similarly, the volume bounded by an interior boundary is computed as a negative value. The element check validates when surfaces are valid surfaces. The no inner rings in polygons check validates when there are no inner rings in the composite surface of a solid.

Collections can be either homogeneous or heterogeneous. A homogeneous collection is a collection of elements where all elements are of the same type. A homogeneous collection can be either a multi-point, multi-line, multi-surface, or multi-solid corresponding to the element types point, line, surface and solid. System 1200 and/or geometry engine 1250 may validate-a homogeneous collection. The validation may involve processing a number of rules. The rules may include, for example, an elements test, a validity test, and a disjointness for multi-solid test. The elements test validates when elements are of the same type and conform to the homogeneous collection type (multi-point, multi-line, multi-surface, multi-solid). The validity test validates when elements of the homogeneous collection are valid. The disjointness for multi-solid test validates when multi-solid elements are disjoint. Disjointness means no-volume intersection and no-area intersection.

In a heterogeneous collection, the elements can be a mixture of different types. For example, a building (simple solid) with the windows/doors (surfaces) can be modeled as a heterogeneous collection. System 1200 and/or geometry engine 1250 may validate a heterogeneous collection. The validation may involve processing rules including a test that may validate when elements of the heterogeneous collection is valid.

After storing different types of geometries using instances of the open data type 1270, users of the three dimensional spatial system 1200 can cause a spatial index 1260 to be created. The spatial index 1260 can be based on geometric characteristics of three dimensional objects. Indexing may include creating multiple indexes. In one example, the indexes may be in R-tree format. The spatial index 1260 may facilitate interacting with database 1280. For example, spatial index 1260 may facilitate accessing a spatial column in database 1280. Creating a spatial index facilitates handling queries interested in three dimensional object properties.

Example queries may include an intersection query. Recall that an instance of an SDO_GEOMETRY may be referred to as a "geometry". Given a geometry as the query object, an intersection query may identify geometries that intersect the query object. This query may require the table being queried to have a spatial index 1260. Using index 1260, the query may be processed in a two-stage filter and refine approach. Using three dimensional MBVs in the spatial index 1260, candidate geometries that may satisfy a query window are first identified. Candidates may then be sent to the geometry engine 1250 to refine and identify the final result. This two-step filtering mechanism allows relatively high resource consuming geometry engine operations to be performed on a few candidate geometries and uses the fast-filtering power of the spatial index 1260 to weed out irrelevant candidates.

The three dimensional spatial system 1200 may also include a three dimensional (3-D) gateway 1225. 3-D gateway 1225 may facilitate the conversion of three dimensional object representations in the open data type 1270 to and from external formats. Therefore, the three dimensional spatial system 1200 may accept and output geography markup language (GML) data types that conform to the GML 3.1.1 standard using a GML converter 1230. The GML converter 1230 may also convert from J3D_GEOMETRY to GML 3.1.1 format and vice-versa. A person having ordinary skill in the art would recognize that GML and J3D_GEOMETRY are mentioned as examples and are not an exhaustive list of possible formats for conversion. For example, other external formats may include CityGML. The conversion functions of the GML converter may be implicitly invoked in a Web Services 1220 framework and/or by use of a Service Oriented Architecture (SOA) Interface 1215.

The 3-D gateway 1225 may also facilitate access to sub-elements of the open data type 1270 through a Java Iterator class. One example Java Iterator class may be referred to as an element extractor 1240. The element extractor 1240 may access sub-elements of three dimensional geometry objects. By specifying parameters, three dimensional geometries can be decomposed into simpler geometries formed from its sub-elements.

The three dimensional spatial system 1200 may facilitate accessing and manipulating three dimensional geometry object data via one or more interfaces (e.g., SQL 1205, Java Database Connectivity (JDBC) 1210, Service Oriented Architecture (SOA) 1215, Web Services 1220).

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A non-transitory computer-readable medium storing computer-executable instructions that when executed by a computer cause the computer to perform a method, the method comprising:

accessing a first geometry object that stores data associated with a first solid, where the solid represented by the first geometry object is a composite solid;

accessing a second geometry object that stores data associated with a second solid;

decomposing the composite solid into a set of simple solids and determining the intersection between the set of simple solids and the solid associated with the second geometry object;

accessing a spatial index that stores data concerning minimum bounding volumes (MBVs) associated with the first geometry object and the second geometry object, where a minimum bounding volume encloses a three dimensional volume;

identifying in the spatial index a first minimum bounding volume (MBV) associated with the first solid;

identifying in the spatial index a second MBV associated with the second solid;

providing a no intersection signal that indicates that the first solid and the second solid do not intersect upon determining that the first MBV and the second MBV do not intersect; and upon determining that the first MBV and the second MBV intersect:

extracting a set of candidate pairs of intersecting surfaces associated with the first geometry object and the second geometry object;

providing the set of candidate pairs of intersecting surfaces to a surface-surface logic, where the candidate pairs of intersecting surfaces are decomposed into lines;

establishing a value for a solid-solid intersection signal that indicates whether the first solid and the second solid intersect, where the value is based, at least in part, on surface-surface intersections, surface-line intersections, and line-line intersections, and where intersections are formed by the candidate pairs of intersecting surfaces; and providing the solid-solid intersection signal.

2. The non-transitory computer-readable medium of claim 1, where the first geometry object is an SDO_GEOMETRY object and where the second geometry is an SDO_GEOMETRY object.

3. The non-transitory computer-readable medium of claim 2, where the spatial index is an R-Tree based spatial index.

4. The non-transitory computer-readable medium of claim 3, where extracting the set of candidate pairs of intersecting surfaces includes:

decomposing the first solid into a first set of surfaces;

decomposing the second solid into a second set of surfaces;

computing a first R-Tree associated with the first set of surfaces, where the first R-Tree stores data concerning minimum bounding boxes associated with the first set of surfaces;

computing a second R-Tree associated with the second set of surfaces, where the second R-Tree stores data concerning minimum bounding boxes associated with the second set of surfaces;

creating a spatial join of the first R-Tree and the second R-Tree; and identifying the set of candidate pairs of intersecting surfaces based, at least in part, on the spatial join.

5. The non-transitory computer-readable medium of claim 4, where the method includes controlling the surface-surface logic to decompose a set of surfaces into a set of lines, to provide at least one member of the set of surfaces and at least one member of the set of lines to a surface-line logic, and to establish a value for the surface-surface intersection signal based, at least in part, on a value of a surface-line intersection signal provided by the surface-line logic.

6. The non-transitory computer-readable medium of claim 5, where the method includes controlling the surface-line logic to decompose at least one surface received from the surface-surface logic into a second set of lines, to provide at least one member of the set of lines received from the surface-surface logic and at least one member of the second set of lines to a line-line logic, and to establish a value for the surface-line intersection signal based, at least in part, on a value of a line-line intersection signal provided by a line-line logic.

7. The non-transitory computer-readable medium of claim 6, where the method includes controlling the line-line logic to establish a value for the line-line intersection signal based on whether two lines intersect.

8. The non-transitory computer-readable medium of claim 3, where the first geometry object includes data describing an outer geometry associated with the first solid and data describing an inner geometry associated with a hole in the first solid, where the hole is bounded by the outer geometry.

9. The non-transitory computer-readable medium of claim 8, where the method includes determining whether the second geometry object is inside a hole in the first geometry object upon determining that the first MBV and the second MBV do not intersect, where the determining includes determining whether the second geometry object is bounded by the inner geometry associated with the first geometry object.

10. The non-transitory computer-readable medium of claim 3, where the solid represented by the first geometry object is a polyhedron.

11. The non-transitory computer-readable medium of claim 10, where the polyhedron is one of, a convex polyhedron, and a concave polyhedron.

12. The non-transitory computer-readable medium of claim 3, where the solid represented by the first geometry object is a collection of geometries.

13. The non-transitory computer-readable medium of claim 12, where the method includes decomposing the collection of geometries into a set of simple solids and determining intersection between the set of simple solids and the solid associated with the second geometry object.

14. A non-transitory computer-readable medium storing computer-executable instructions that when executed by a computer cause the computer to perform a method, the method comprising:

accessing a first geometry object;

accessing a second geometry object;

accessing a spatial index that stores data concerning MBVs associated with the first geometry object and the second geometry object;

identifying in the spatial index a first MBV associated with the first geometry object;

identifying in the spatial index a second MBV associated with the second geometry object;

providing a no intersection signal that indicates that the first geometry and the second geometry do not intersect upon determining that the first MBV and the second MBV do not intersect; and upon determining that the first MBV and the second MBV intersect, extracting a set of candidate pairs of intersecting features associated with the first geometry object and the second geometry object, where extracting the set of candidate pairs of intersecting surfaces includes:

decomposing the first solid into a first set of surfaces, where a concave geometry is decomposed as a concave geometry without performing a concave to convex transformation;

decomposing the second solid into a second set of surfaces;

computing a first R-Tree associated with the first set of surfaces, where the first R-Tree stores data concerning minimum bounding boxes associated with the first set of surfaces;

computing a second R-Tree associated with the second set of surfaces, where the second R-Tree stores data concerning minimum bounding boxes associated with the second set of surfaces;

creating a spatial join of the first R-Tree and the second R-Tree; and identifying the set of candidate pairs of intersecting surfaces based, at least in part, on the spatial join; and providing an intersection signal that indicates whether the first geometry and the second geometry intersect, where the signal is based, at least in part, on establishing a value that indicates whether the first solid and the second solid intersect, where the value is based, at least in part, on surface-surface intersections, surface-line intersections, and line-line intersections.

15. A computing system, comprising a processor; a memory; and an interface to connect a group of logics, the group of logics comprising:

a spatial index logic to produce an R-Tree based spatial index that stores data describing a set of minimum bounding volumes (MBVs) associated with a set of geometry objects;

a surface logic to identify a set of surfaces associated with a member of the set of geometry objects;

a solid-solid logic to determine whether two solids intersect based, at least in part, on data stored in the spatial index and on a determination of whether a member of a first set of surfaces associated with a first geometry intersects with a member of a second set of surfaces associated with a second geometry, where a concave geometry is decomposed as a concave geometry without performing a concave to convex transformation; where the first set of surfaces and the second set of surfaces being provided by the surface logic, the two solids being associated with two geometry objects for which MBVs are present in the spatial index; and a surface-surface logic to determine whether two surfaces intersect, where the surface-surface logic is to identify a set of candidate pairs of intersecting surfaces associated with the two solids, where the candidate pairs of intersecting surfaces are decomposed into lines; to establish a value that indicates whether the first solid and the second solid intersect, where the value is based, at least in part, on surface-surface intersections, surface-line intersections, and line-line intersections, and further where intersections are formed by the candidate pairs of intersecting surfaces and lines; and to provide the set of candidate pairs of intersection surfaces to the surface-surface logic.

16. The computing system of claim 15, where members of the set of geometry objects are SDO_GEOMETRY objects.

17. The computing system of claim 15, where the surface logic includes:
  a decomposition logic to decompose a solid into a set of surfaces;
  an R-Tree logic to compute an R-Tree associated with the set of surfaces, where the R-Tree stores data associated with minimum bounding boxes associated with the set of surfaces;
  a spatial join logic to create a spatial join of R-Trees associated with sets of surfaces; and
  an identification logic to identify the set of candidate pairs of intersecting surfaces based, at least in part, on the spatial join.

18. The computing system of claim 17, including:
  a point-point logic to determine whether a first point and a second point intersect;
  a line-point logic to determine whether a line and a point intersect, where the line-point logic is to decompose the line into a set of points and to provide a member of the set of points and the point to the point-point logic;
  a line-line logic to determine whether a first line and a second line intersect, where the line-line logic is to decompose the first line into a first set of points and to provide a member of the first set of points and the second line to the line-point logic; and
  a surface-line logic to determine whether a surface and a line intersect by decomposing the surface into a set of lines and providing a member of the set of lines and the line to the line-line logic.

19. The computing system of claim 15, including a hole logic to determine whether a first solid includes an inner geometry describing a hole and whether a second solid resides in the hole.

20. The computing system of claim 15, including a composite solids logic to decompose a composite solid into a set of simple solids and to provide the set of simple solids to the solid-solid logic.

21. The computing system of claim 15, including a multiple solids logic to decompose a solid comprising a collection of solids into a set of simple solids and to provide the set of simple solids to the solid-solid logic.

* * * * *

UNITED STATES PATENT AND TRADEMARK OFFICE
CERTIFICATE OF CORRECTION

PATENT NO. : 8,228,326 B2
APPLICATION NO. : 12/152147
DATED : July 24, 2012
INVENTOR(S) : Kothuri et al.

It is certified that error appears in the above-identified patent and that said Letters Patent is hereby corrected as shown below:

On the Title Page, Item (56) under "Other Publications", line 7, delete "Scine" and insert -- Science --, therefor.

In column 1, line 11, delete "Kazar, and having an," and insert -- Kazar, --, therefor.

In column 2, line 62, delete "markup-language." and insert -- markup language. --, therefor.

In column 3, line 52, delete "logics'" and insert -- logics --, therefor.

In column 3, line 54, delete "single-logical" and insert -- single logical --, therefor.

In column 5, line 3, delete "first-geometry" and insert -- first geometry --, therefor.

In column 11, line 66, delete "also," and insert -- also --, therefor.

In column 13, line 41-61, delete "In another example, ...................distance computations)." and insert the same on col. 13, line 40 after "solid)." as a continuation of the same paragraph.

In column 14, line 4-5, delete "SDB_ORDINATES" and insert -- SDO_ORDINATES --, therefor.

In column 15, line 23, delete "<$V_1$, $V_2+$,>" and insert -- <$V_i$, $V_{i+1}$> --, therefor.

In column 16, line 36, delete "validate-a" and insert -- validate a --, therefor.

In column 20, line 44, in Claim 15, delete "comprising" and insert -- comprising: --, therefor.

Signed and Sealed this
Sixth Day of November, 2012

David J. Kappos
*Director of the United States Patent and Trademark Office*